(12) United States Patent
Argue et al.

(10) Patent No.: US 10,108,951 B2
(45) Date of Patent: *Oct. 23, 2018

(54) SPLITTING A PURCHASE AMONG MULTIPLE PARTIES USING AN ELECTRONIC RECEIPT AFTER THE TRANSACTION

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 110 days.

This patent is subject to a terminal disclaimer.

(21) Appl. No.: 13/691,646

(22) Filed: Nov. 30, 2012

(65) Prior Publication Data

US 2014/0156508 A1 Jun. 5, 2014

(51) Int. Cl.
| | |
|---|---|
| *G06Q 20/32* | (2012.01) |
| *G06Q 20/04* | (2012.01) |
| *G06Q 20/20* | (2012.01) |
| *G06Q 20/10* | (2012.01) |

(52) U.S. Cl.
CPC ......... *G06Q 20/32* (2013.01); *G06Q 20/0453* (2013.01); *G06Q 20/102* (2013.01); *G06Q 20/20* (2013.01); *G06Q 20/3276* (2013.01)

(58) Field of Classification Search
CPC .............. G06Q 20/102; G06Q 20/209; G06C 20/3227; G06C 20/3274
See application file for complete search history.

(56) References Cited

U.S. PATENT DOCUMENTS

| | | |
|---|---|---|
| 6,983,261 B1 | 1/2006 | Francisco |
| 7,370,794 B2 | 5/2008 | Trane |
| 7,577,610 B2 | 8/2009 | Miyuki |
| 7,873,572 B2 | 1/2011 | Reardon |
| 8,224,700 B2 | 7/2012 | Silver |
| 8,306,860 B2 | 11/2012 | Dunsmore |
| 8,498,900 B1 | 7/2013 | Spirin |

(Continued)

OTHER PUBLICATIONS

BILLR (http://web.archive.org/web/20120907174753/http://billr.me/).*

(Continued)

*Primary Examiner* — Douglas W Owens
*Assistant Examiner* — Laura Yesildag
(74) *Attorney, Agent, or Firm* — Bryan Cave Leighton Paisner LLP

(57) ABSTRACT

A method is disclosed for a customer splitting the cost of a purchase with other persons. An electronic receipt may be viewed on a mobile electronic device with electronic receipts software thereon. Using a device configured according to one or more embodiments of the invention, a customer is able to select the receipt for splitting as well as selecting other persons to share the cost of items on the receipt. The customer may allocate item cost among those other persons. Information may be sent to a server or computer system to provide notifications to the other persons. The server may then process the request and transmit receipt information/notifications to the person requested by the customer.

20 Claims, 9 Drawing Sheets

(56) References Cited

U.S. PATENT DOCUMENTS

| | | |
|---|---|---|
| 8,504,433 B2 | 8/2013 | Vadhri |
| 2005/0108116 A1 | 5/2005 | Dobson |
| 2008/0189189 A1 | 8/2008 | Morgenstern |
| 2009/0037286 A1 | 2/2009 | Foster |
| 2009/0234771 A1 | 9/2009 | Ledbetter |
| 2010/0082481 A1 | 4/2010 | Lin |
| 2010/0125495 A1 | 5/2010 | Smith et al. |
| 2012/0150728 A1 | 6/2012 | Isaacson |
| 2012/0166332 A1* | 6/2012 | Naaman .......................... 705/40 |
| 2012/0173350 A1 | 7/2012 | Robson |
| 2012/0290472 A1 | 11/2012 | Mullen et al. |
| 2013/0085931 A1 | 4/2013 | Runyan |

OTHER PUBLICATIONS

Final Office Action dated Apr. 7, 2016 for U.S. Appl. No. 13/691,665.

* cited by examiner

SPLITTING A PURCHASE AMONG MULTIPLE PARTIES USING AN ELECTRONIC RECEIPT AFTER THE TRANSACTION

RELATED U.S. APPLICATION

This application is related to U.S. application Ser. No. 13/691,665, filed Nov. 30, 2012. The application is incorporated herein by reference for all purposes.

BACKGROUND

Field of the Invention

This invention relates to receipts and receipt management systems and more particularly to an approach for allowing a customer to split a receipt, bill, or shopping cart with other people.

Background of the Invention

Many point-of-sale (POS) systems currently in use today do not support important emerging technologies. For example, current POS systems are limited in their ability to handle electronic receipts and to facilitate management of receipts for transactions which generated electronic receipts. As a result, the adoption of electronic receipts is hindered or prevented by the inability to provide the functionality associated with a paper receipts or to adequately manage electronic receipts, and in particular for sharing a bill or the purchase of a cart of items among users of different devices. Accordingly, what is needed is a system and method for facilitating use of electronic receipts in new novel ways. As will be seen, the invention provides such an approach in an elegant manner.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the embodiments, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, a novel approach is provided for managing receipts and in particular for sharing or splitting a bill, shopping cart, or purchase with friends and other persons. For simplicity, this will typically be referred to herein simply as splitting a receipt.

Figure 1:
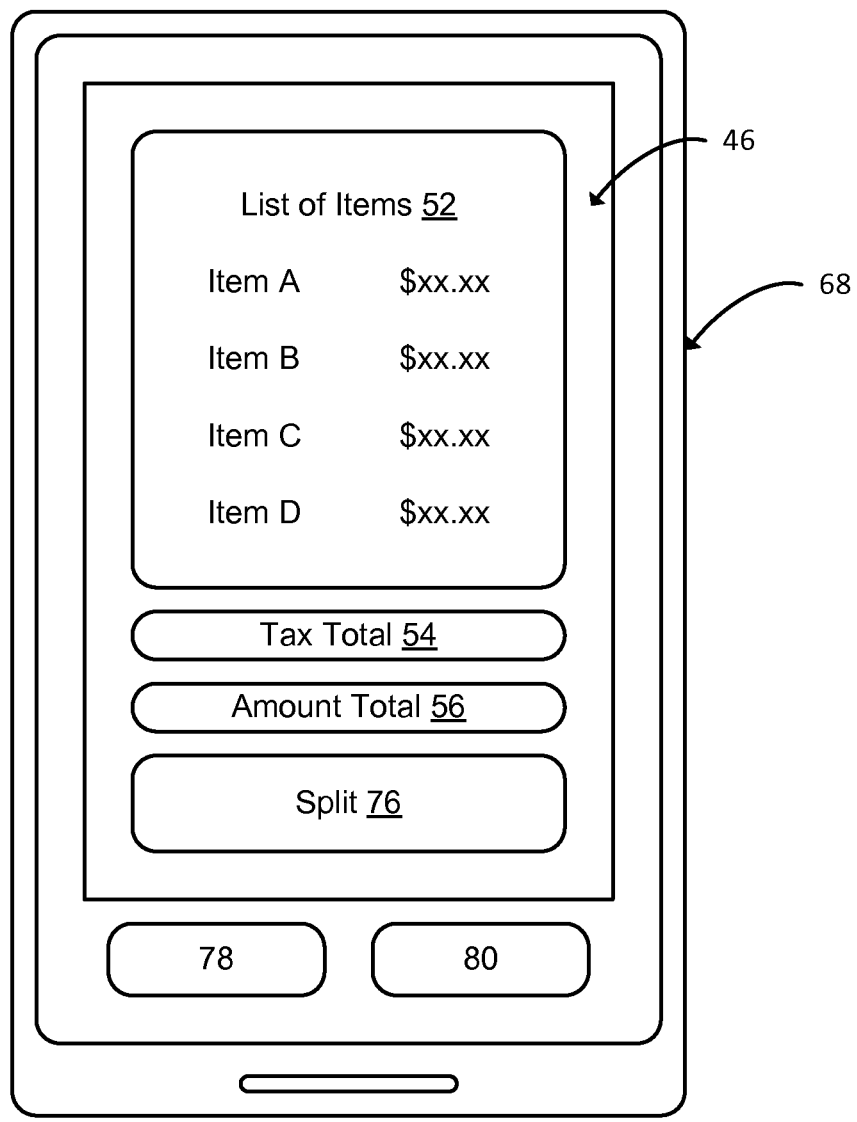
FIG. 1 is a schematic block diagram of one embodiment of a receipt viewed on a mobile electronic device.

In selected embodiments, a customer may utilize a mobile electronic device, such as a smart phone or tablet. Referring to FIG. 1, an electronic receipt 46 may be displayed or managed on a mobile electronic device 68. The device 68 may include receipt management software which allows the customer to receive electronic receipts on and manage receipts with the mobile electronic device 68. The software may allow the customer to interface with the electronic receipt, with a store point of sale (POS) system, and with a back office/supervisory receipts management system. The electronic receipt software and/or the receipts management system may allow the customer to share or split a receipt, bill, or shopping cart among other people such as among different users of mobile electronic devices. The customer may select a person to split a receipt with, and may split the costs associated with that receipt with this person.

An electronic receipt 46 may include a list of items 52 which may show the items purchased on that receipt and which may show the cost of those items. The receipt may also display the taxes or other surcharges 54 and the after tax total 56. The electronic receipt 46 may be displayed in a manner similar to a paper receipt in this regard. The receipt management software may display the electronic receipt 46 with a button 76 to allow the customer to split the receipt among other persons.

Typically, such a receipt 46 is for an event or purpose which is shared among a group of people. The receipt may include items for a party, a meal purchase, items for a trip, etc. In these cases, it is often desirable to split the costs for purchasing the items which are recorded on a receipt among the various people involved with the event. The customer may allocate different items among one or more other persons to split the receipt and determine how much each person should pay. Different allocation methods may be used to divide the receipt/item cost in a manner agreed upon by the various people. The receipt management software may send notifications to individuals indicating how much they should pay, and in some cases who they should pay. The receipt management software may assist persons with payment of their portion of the receipt.

Various parts of a receipts management system may facilitate communication with the customer and others and may allow the customer to split receipts among other persons. Various parts of a receipts management system are described to illustrate how these may allow a customer to manage electronic receipts, and more particularly to split receipts among other people. In certain embodiments, a machine-readable code may be used to interact between the customer's mobile electronic device, receipts, a receipts management server, and/or the POS system. The machine readable code may comprise a conventional barcode or a two-dimensional barcode (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located. A machine readable code may facilitate the installation of electronic receipts software by the customer or other persons known to the customer. In some embodiments, a machine readable code may be accompanied by an alpha-numeric code. A customer may obtain electronic receipts and manage electronic receipts through an account established with a receipt management server. The customer's mobile device telephone number, member number, etc. may be used to identify the customer and to deliver electronic receipts to the customer or otherwise interact with the customer.

In general, the purpose of a receipts system is to facilitate the handling of receipts in a manner which is convenient to the customer and which allows a customer to easily perform desired management tasks related to receipts such as accounting, cost allocation, and splitting receipts. Many challenges arise in using electronic receipts. In particular, the use of electronic receipts may create challenges when a customer needs to perform subsequent receipt management functions such as splitting receipts with friends or other persons.

Embodiments in accordance with the invention may be embodied as an apparatus, system, device, method, computer program product, or other entity. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of embodiments described herein may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The embodiments are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
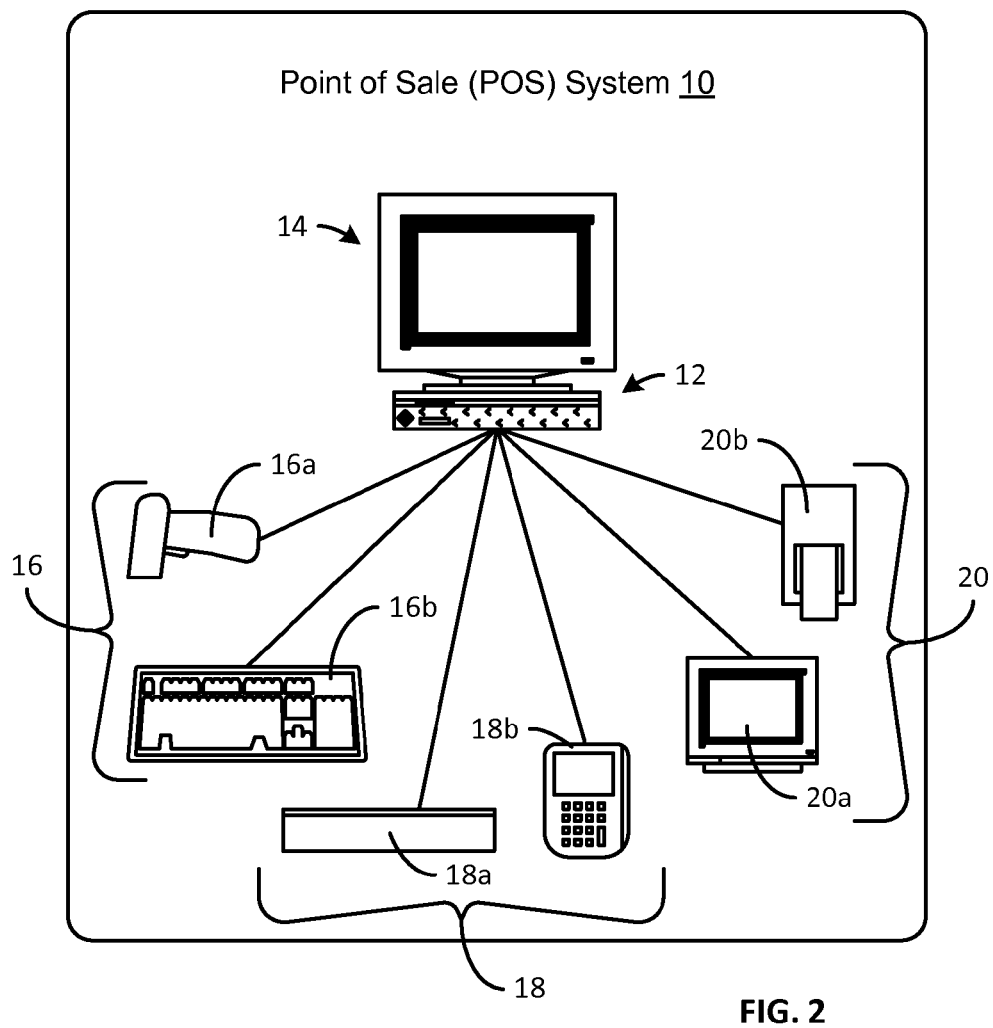
FIG. 2 is a schematic block diagram of one embodiment of a point-of-sale (POS) system having the capability to allow splitting of receipts, bills, and purchases among customers.

Referring to FIG. 2, in selected embodiments, the hardware, software, or hardware and software of a POS system 10 may be configured to implement one or more methods in accordance with embodiments described herein. For example, a POS system 10 may be manufactured, programmed, modified, or upgraded to support providing electronic receipts to customers and to facilitate subsequent management of the receipt. In particular, a POS system may allow a customer to split a receipt with other persons. In discussing the present system, it is appreciated that the system may involve one or more parts of a local POS terminal and associated computers or servers, remote computers or servers, customer devices such as a mobile electronic device, and associated equipment.

A POS system 10 may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 may include an accounting interface to pass certain information to one or more in-house or independent accounting applications. A POS system 10 may also communicate with third parties and may transmit receipt information and facilitate customer management of receipts.

Figure 3:
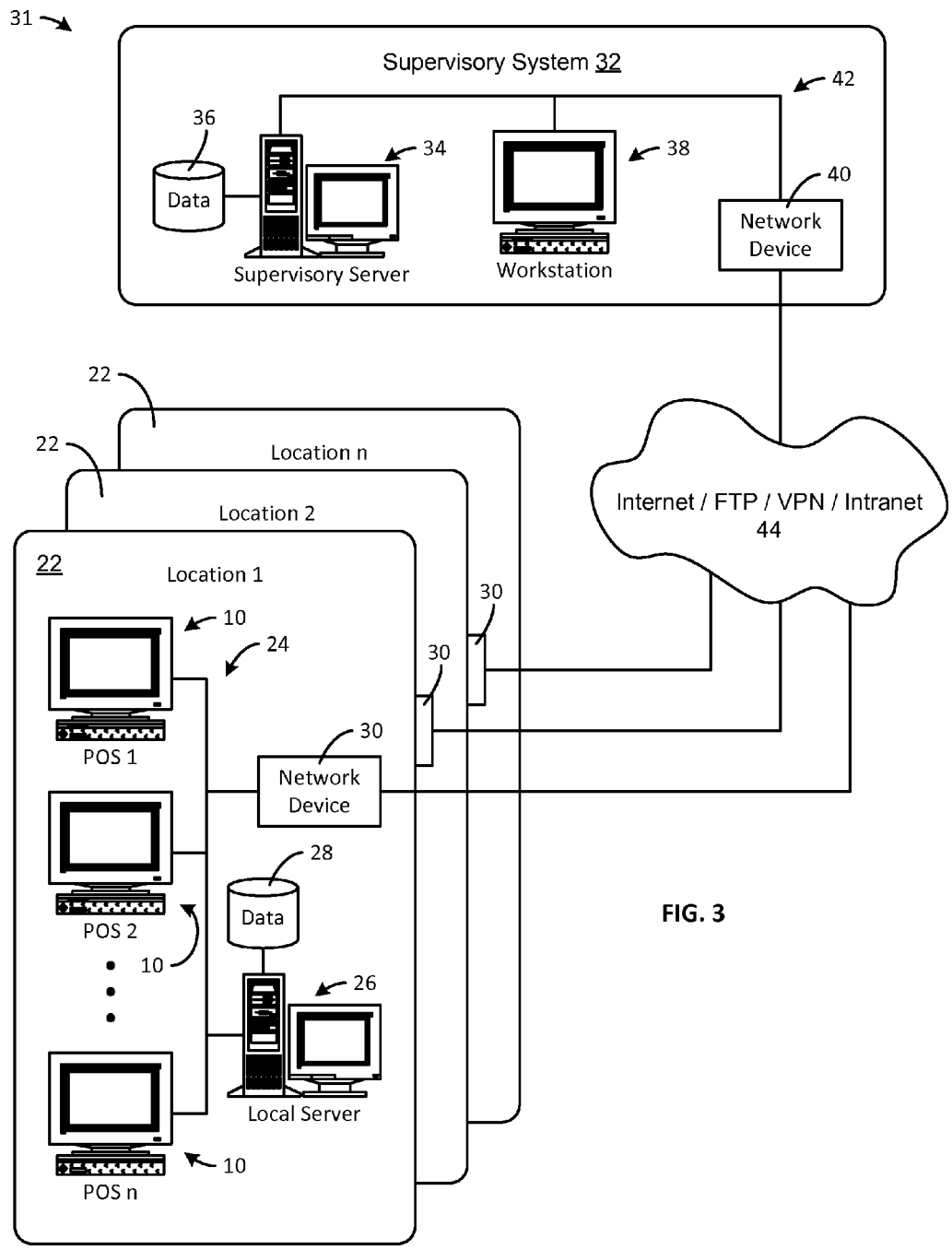
FIG. 3 is a schematic block diagram of one embodiment of multiple POS systems operating in the context of an enterprise-wide system.

Referring to FIG. 3, in selected embodiments, a POS system 10 may operate substantially independently, as a stand-alone unit. Alternately, a POS system 10 may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

It is thus appreciated that in discussing the functionality of the various POS terminals and servers, the embodiments described herein may be implemented in a system contained within a single location or across multiple locations. By way of example, the functionality accomplished by a server or computer, such as storing, processing, and transmitting/ sending receipt information, may be accomplished by a local computer or a remote computer such as servers 26 and 34.

Figure 4:
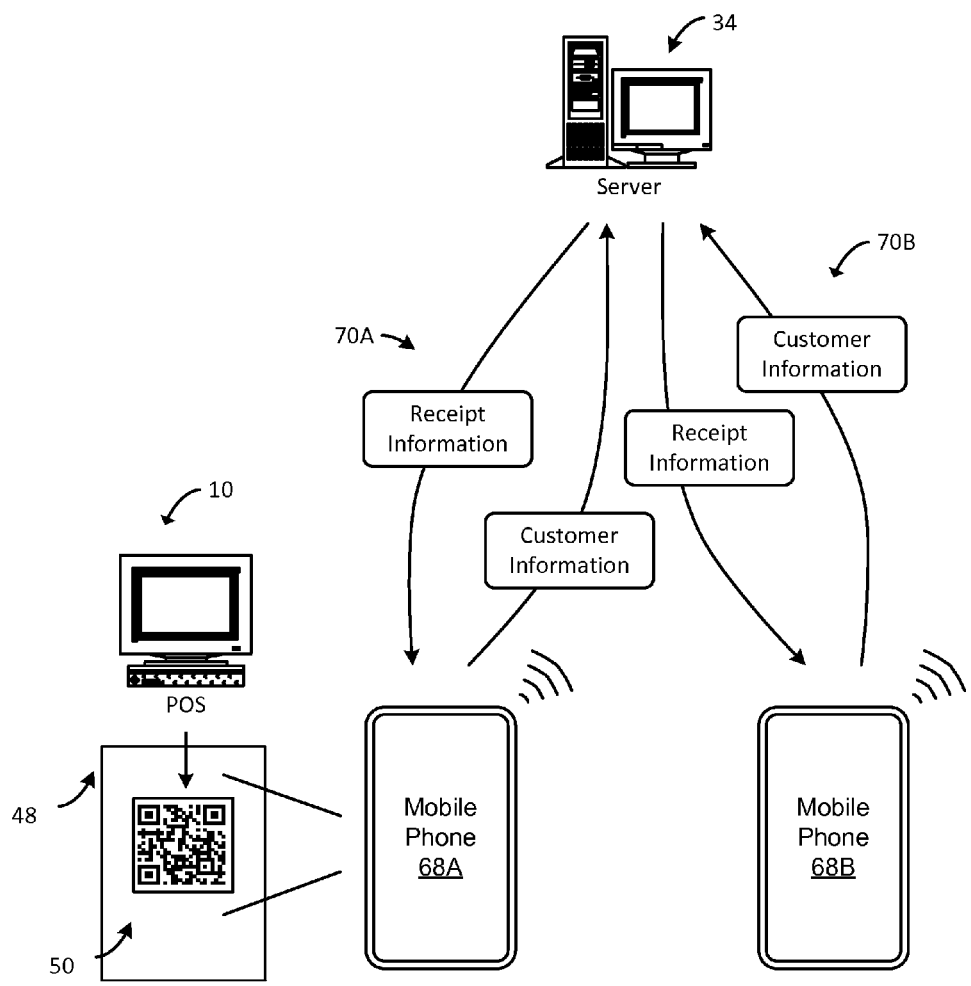
FIG. 4 is a block diagram illustrating the flow of data within one embodiment.

Referring to FIG. 4, a customer may download or may already have downloaded electronic receipts software to a mobile electronic device 68A. The mobile electronic device 68A may be a smart phone, tablet PC, etc. A customer may have previously received a paper receipt 48 which includes an invitation such as a 2d barcode 50 to use electronic receipts instead of paper receipts and may have installed electronic receipts software on the mobile electronic device 68A.

As indicated at 70A, the customer may have an account with the computer server 34 and may transmit information to the server 34. It will be appreciated that the functionality of server 34 may be implemented by server 26, etc. The computer server 34 may likewise transmit information to the mobile device 68A. The customer may receive electronic receipts on the mobile device 68A and the electronic receipts software on the mobile device 68A may enable them to manage electronic receipts. Additionally, the electronic receipts software may allow the customer to interact with a POS system 10 and with other persons via the mobile electronic device 68A.

In addition to the customer, one or more additional persons associated with the customer may have an electronic device 68B which has electronic receipts software. The receipts management software may allow the customer to manage electronic receipts through interactions with other persons known to them. These other persons may have previously received a paper receipt 48 which includes an invitation to use electronic receipts instead of paper receipts and may have installed electronic receipts software on the mobile electronic device 68B.

Both the customer and the additional person(s) may have created an account with the receipts management server. The account may include a login such that the account is secure. The account and/or account creation process may facilitate verification of the person's identity and/or contact information, such as their email address or phone number. The account information may include a verified telephone number for a mobile electronic device.

Additionally, the customer may send an invitation to these other persons inviting them to download electronic receipts software, or may send a notification to these other persons that they desire to share a receipt with them and inviting them to download receipts management software and similarly create an account, etc. with the server 34 to allow them to manage electronic receipts in the manner discussed herein.

The receipts system may allow a customer to easily communicate with other person via mobile electronic devices 68A, 68B. The customer may create account settings with an account with a receipts management server 34 or personalized settings within receipt management software on their device 68B. These settings may include contact information for other persons including information such as their name and also information such as a preferred method of delivering messages and the like to that person.

Where another person has receipts management software on a mobile electronic device 68B, the preferred method of delivering messages may be a text message and the software may thus store the device telephone number. Where another person does not have receipts management software on a mobile electronic device, the preferred method of communication may be through email, and the software may store an email address for this person. The receipt management software may also include bank account information for the person. The software may include account or routing information for a person sufficient to allow that person to send or approve a message to their bank to transfer money to another person as desired. Payments may also be similarly implemented through various other payment businesses and peer to peer payment systems.

Figure 5:
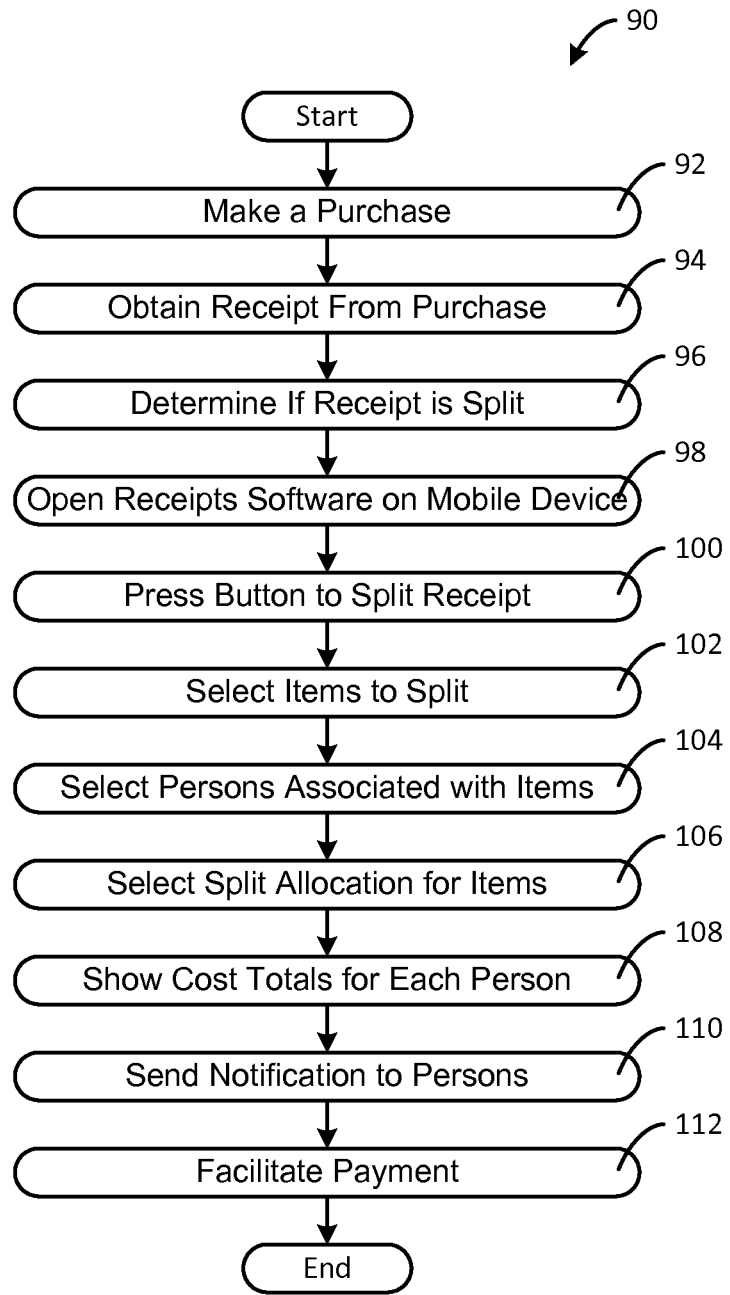
FIG. 5 is a block diagram of one embodiment of a method for splitting a receipt.

Referring to FIG. 5, a first process 90 for splitting a receipt/purchase according to the present invention is shown. A customer may first make a purchase 92. The customer may then obtain 94 an electronic receipt 46 for that purchase. The customer typically has receipt management software on a mobile electronic device 68A. If the customer determines 96 that the receipt should be split, they may open 98 receipt management software on the device and view the receipt 74 on the electronic device 68A. The customer may then press 100 a button on the device to split the receipt. The button may be a digital button or menu command created by the receipt management software.

As discussed, the electronic receipt 46 is typically displayed on the mobile electronic device in a manner which shows the items 52 which were purchased. The customer may select 102 which items on the receipt 46 need to be split. This may be accomplished in different ways. The customer may select all items on the receipt to split together. The customer may select a group of items on the receipt to split together. The customer may also select individual items on the receipt to split. The customer may select items on the receipt 46 in different combinations of the above. By way of example, the customer may select a group of items to be split in one way and select another item of group of items to be split in a different way.

The customer may then select 104 one or more individuals associated with an item(s). By way of example, one person could be associated to certain items on a receipt. Multiple persons could be associated with other items on a receipt. The customer may select 106 how the item(s) are split. It is understood that in the present application, split refers to how the cost of one or more items is allocated among themselves and also among one or more other people. Where a single person is associated with an item or group of items, the software may automatically assign 100% of the cost of that item to that person. Where no person has been assigned to an item, the receipt management software may allocate 100% of the cost of that item to the customer who paid for the purchase associated with the receipt 46.

Where multiple persons are associated with an item or group of items, the customer may decide how the item or group of items is allocated among the persons associated with that item. The customer may decide that the cost of that item should be allocated equally between the persons associated with that item. The customer may also decide that the cost of that item should be allocated in a different manner, and may enter a percentage allocation for the item or group. The customer may enter a percentage as a number into the receipt management software for each person; all of the percentages adding up to 100%. The software may also provide one or more bars or scales with a slider between 0 and 100 to allocate a portion of that item cost to a person.

After allocating the item costs between different persons, the receipt management software may show 108 the totals of the split receipt, showing the total cost for each person associated with the receipt. The receipt management software may also send 110 notifications to the persons associated with the receipt. As discussed, the software or server 34 may have contact information for the different persons saved therein. These contacts may be selected when a customer associates items on the receipts with persons. The customer may press a button or otherwise enter a command to send a message to the other persons. The message may be sent via text or email and may show how much they owe for that purchase. The message could have a link to a website to show the breakdown of cost allocation for the receipt 46. The receipts management server 34 may provide this webpage and provide this information to the persons.

If another person does not have the receipts management software, the message may provide an invitation to get the receipt management software. Additionally, the receipt management system may facilitate 112 providing payment to the customer for the purchase associated with the receipt. Particularly where other persons have receipt management software and have created an account, they may have provided routing information for their bank and may have set up transfer processes to pay money to the customer. The message may include a link or command to pay the designated amount to the customer for the receipt. If they approve of the allocation, the person may initiate a transfer of money to the customer via the message.

Figure 6:
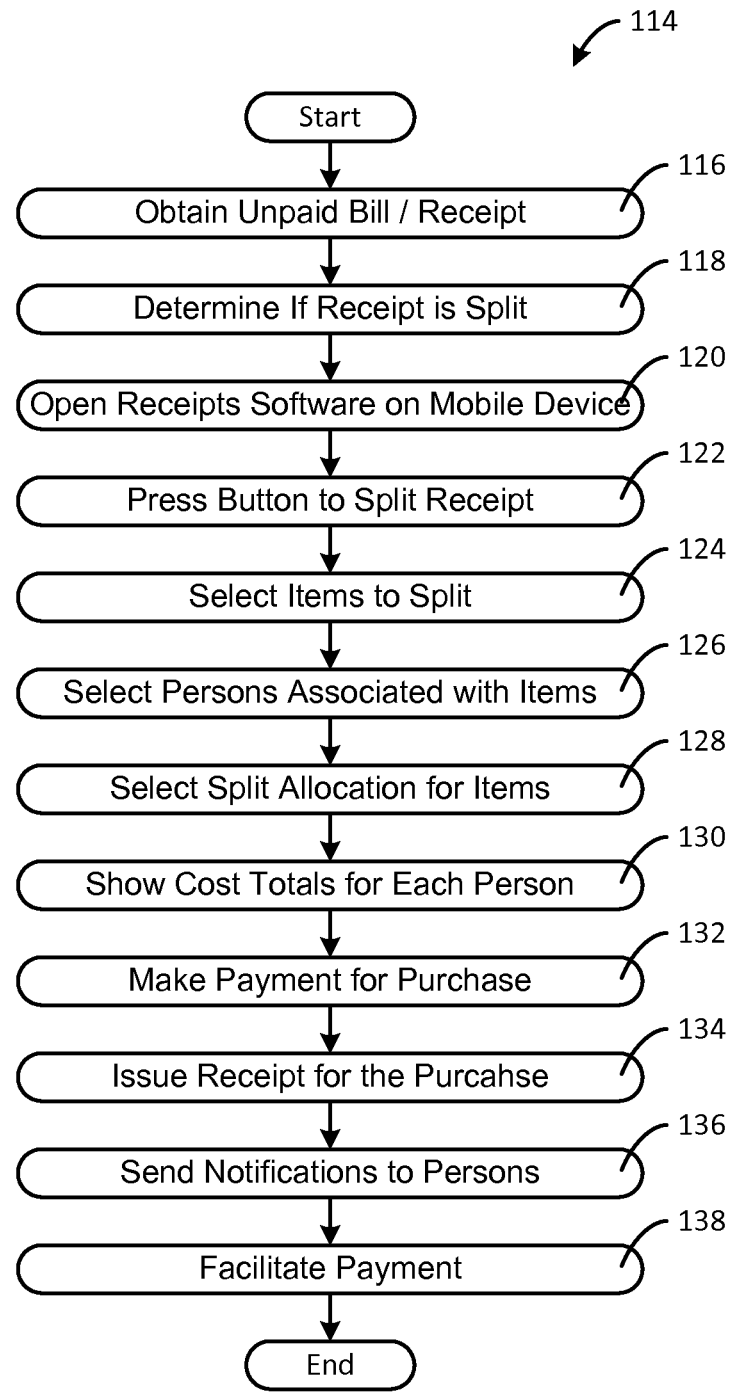
FIG. 6 is a block diagram of one embodiment of a method for splitting a receipt.

Referring to FIG. 6, a second process 114 for splitting a purchase according to the present invention is shown. As discussed above, it may be common for a person to make a purchase, receive an electronic receipt, and then allocate costs among different person for that purchase. It may also be common for a customer to allocate costs among different persons before completing a purchase. This may be the case when the customer creates an electronic shopping cart of items on their mobile electronic device 68A, or where a bill is presented to a customer in receipt format.

In these situations, a customer may (typically with the other persons in a group) first receive 116 an unpaid receipt bill. The receipt bill refers to a bill which is presented to the customer, often in the format of a receipt. The receipt bill may be viewed on the mobile electronic device in a manner similar to the receipt 46. The receipt bill may be from a restaurant, for example, after a customer and group of one or more other persons has eaten at the restaurant.

Where the bill is presented to the customer in paper form, the bill may include a 2D barcode such as a QR code. The barcode may allow the customer to scan the barcode and thereby obtain an electronic copy of the bill. By way of example, the scanning the barcode may cause the mobile electronic device to obtain the bill from a receipts management server 34. In some situations, the barcode may include the bill information embedded therein in a format known to the receipt management software such as delineated text or values. The customer may capture the barcode with a camera on the mobile electronic device and, from the barcode, the software may have the data necessary to construct a version of the bill electronically and allow the customer to split the bill or otherwise mange the bill.

The receipt bill may also be in the format of a shopping cart of selected items for purchase. The customer may utilize a mobile electronic device 68A, such as a smart phone or tablet computer, while shopping at a brick and mortar store to create a shopping cart of items for purchase. Mobile self-checkout software loaded on the electronic device 68A may facilitate this. The customer may create a shopping cart of items which are selected for purchase by using the mobile electronic device camera to capture a UPC code on each item. The mobile self-checkout software may, from the UPC code, obtain and store information regarding the product and may then allow the customer to enter a quantity of the item for purchase and the price for the item if necessary.

The customer may proceed in this manner while shopping; selecting items for purchase, scanning the UPC code associated with that item, and creating a digital shopping cart on the mobile electronic device 68 which includes a list of items selected for purchase. When the customer is ready to checkout and pay for the selected items, the customer may allocate the item costs among the persons associated with the receipt. Alternatively, the customer may allocate the items among different persons before checkout as these items are added to the shopping cart. Where the receipt bill is from a restaurant or the like, the customer may allocate the items after receiving the receipt bill.

With any of the above receipt bills/shopping carts, if the customer determines 118 that the receipt should be split, they may open 120 receipt management software on the device and view the receipt bill on the electronic device 68A. The customer may then press 122 a button on the device to split the receipt. The button may be a digital button or menu command created by the receipt management software.

The receipt bill may be displayed similar to how an electronic receipt 46 is displayed on the mobile electronic device; i.e. in a manner which shows the items 52 which are selected for purchase. The customer may select 124 which items on the receipt 46 need to be split. This may be accomplished in different ways. The customer may select all items on the receipt to split together. The customer may select a group of items on the receipt to split together. The customer may also select individual items on the receipt to split. The customer may select items on the receipt 46 in different combinations of the above. By way of example, the customer may select a group of items to be split in one way and select another item of group of items to be split in a different way.

The customer may then select 126 one or more individuals associated with an item or group of items. By way of example, one person could be associated to certain items on a receipt. Multiple persons could be associated with other items on a receipt. The customer may select 128 how the item or group of items are split. It is understood that in the present application, split refers to how the cost of one or more items is allocated among themselves and also among one or more other people. Where a single person is associated with an item or group of items, the software may automatically assign 100% of the cost of that item to that person. Where no person has been assigned to an item, the receipt management software may allocate 100% of the cost of that item to the customer who paid for the purchase associated with the receipt 46.

Where multiple persons are associated with an item or group of items, the customer may decide how the item or group of items is allocated among the persons associated with that item. The customer may decide that the cost of that item should be allocated equally between the persons associated with that item. The customer may also decide that the cost of that item should be allocated in a different manner, and may enter a percentage allocation for the item or group. The customer may enter a percentage as a number into the receipt management software for each person; all of the percentages adding up to 100%. The software may also provide one or more bars or scales with a slider between 0 and 100 to allocate a portion of that item cost to a person.

After allocating the item costs between different persons, the receipt management software may show 130 the totals of the split receipt, showing the total cost for each person associated with the receipt. Where the bill is from a restaurant or another business where a tip is applicable, the receipt management software may suggest a tip amount for each individual and may allow the persons to enter a tip percentage and suggest a tip amount from that percentage. Each person may enter a tip amount for their portion of the purchase, and the software may show their total allocated cost including their tip and taxes. If desired, the software may round each person's amount to the nearest one dollar, 5 dollars, etc. as selected by each person.

The customer and/or additional persons may then make payment 132 for the purchase. As the bill/shopping cart has been allocated among the different associated persons, each person may see their allocated amount. Each person may thus make payment 132 for their portion of the bill. If necessary or desired, the customer may make payment 132 for the entire bill. A receipt, which may be an electronic receipt 46, may then be issued 134 for the purchase. For an electronic receipt 46, the receipt management server 34 may issue an electronic receipt to the mobile electronic devices 68A, 68B. Particularly where multiple persons pay for their allocated portions of the receipt directly, the receipt may be sent to these persons. Their receipt may show the overall purchase and indicate what they paid for from that purchase.

If necessary, the receipt management system may also send 136 notifications to the persons associated with the receipt. As discussed, the software or server 34 may have contact information for the different persons saved therein. These contacts may be selected when a customer associates items on the receipts with persons. The customer may press a button or otherwise enter a command to send a message to the other persons. The message may be sent via text or email and may show how much they owe for that purchase. The message could have a link to a website to show the breakdown of cost allocation for the receipt 46. The receipts management server 34 may provide this webpage and provide this information to the persons.

If another person does not have the receipts management software, the message may provide an invitation to get the receipt management software. Additionally, the receipt management system may facilitate 138 providing payment to the customer for the purchase associated with the receipt. Particularly where other persons have receipt management software and have created an account, they may have provided routing information for their bank and may have set up transfer processes to pay money to the customer. The message may include a link or command to pay the designated amount to the customer for the receipt. If they approve of the allocation, the person may initiate a transfer of money to the customer via the message.

Figure 7:
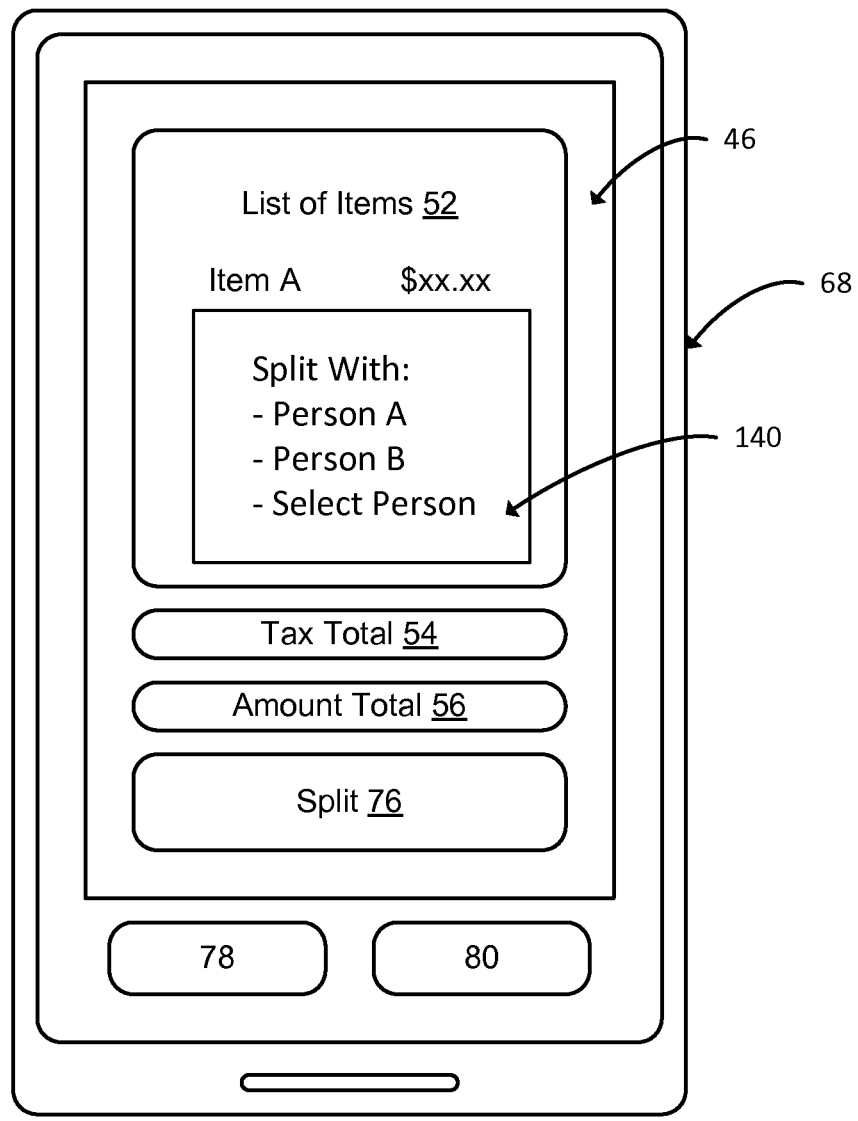
FIG. 7 is a schematic block diagram of one embodiment of a receipt viewed on a mobile electronic device.

Referring now to FIG. 7, in splitting a receipt or bill, the customer will typically view the receipt 46 on a mobile electronic device 68. The customer may select an item, group of items, or all items on the receipt and may then press a bottom 76 or other command to split these items. This may cause the software to show a menu or window 140 allowing the customer to select persons to split the cost of the selected item(s). The menu 140 may show likely persons and may include an option to select a person from known contacts or profile settings. The software may provide suggested persons in the menu. These suggested persons may be persons who have already split items on the receipt 46 or persons who commonly split items with the customer. The customer may select one or more persons, including themselves, to split the cost of an item and these persons may be associated with that item on the receipt 46.

Figure 8:
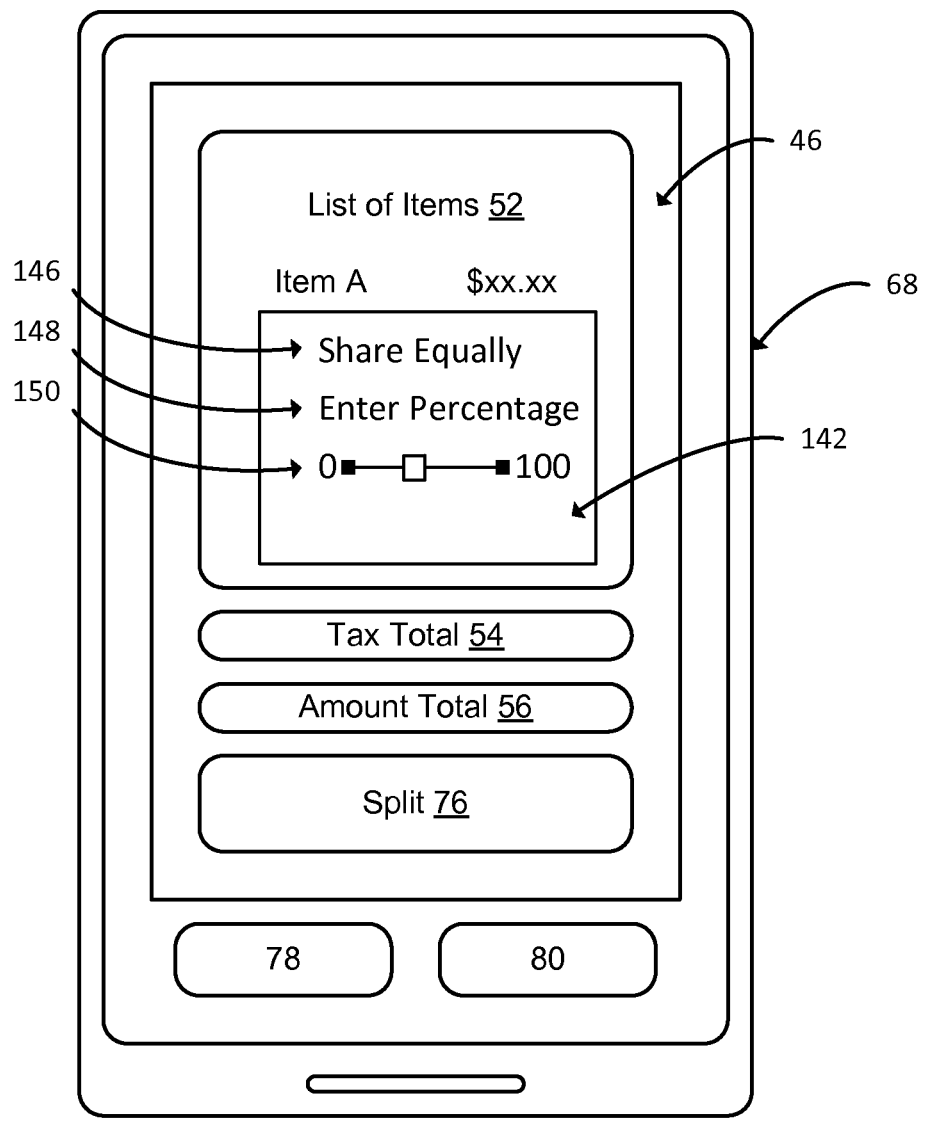
FIG. 8 is a schematic block diagram of one embodiment of a receipt viewed on a mobile electronic device.

Referring to FIG. 8, a customer may allocate the cost of the item for the associated persons. After selection of the persons associated with an item, the software may display a menu or window 142 allowing the customer to allocate the item cost among the persons. The menu 142 may include an option 146 to share the cost equally among the persons. The menu 142 may include an option 148 to enter a percentage for each of the persons, and may autocomplete the percentage of the last person so that the allocation sums to 100%. The menu 142 may also provide a slider option 150 where the customer can simply move a slider button between 0 and 100 percent to allocate item cost to a person. If some cost has been allocated to a person, a slider associated with a second person could be reduced to move between 0 and the remaining unallocated percentage of the item cost.

A customer may wish to allocate cost among different people for many reasons. The customer and other persons may be purchasing items together for a trip or party and may wish to split the cost. The customer and others may be eating out or at an event together and may wish to split the cost. In many situations, it may be desirable to allocate the cost or an item or group of items differently among the persons. For example, one person may entirely consume a food at a restaurant while other items are shared. Thus, one or more items may be entire allocated to a single person or fewer persons while other items may be allocated to more or different persons. A receipt may contain personal items for one person and shared items for a group event. The customer may allocate the cost of items as needed to accommodate the situation.

Figure 9:
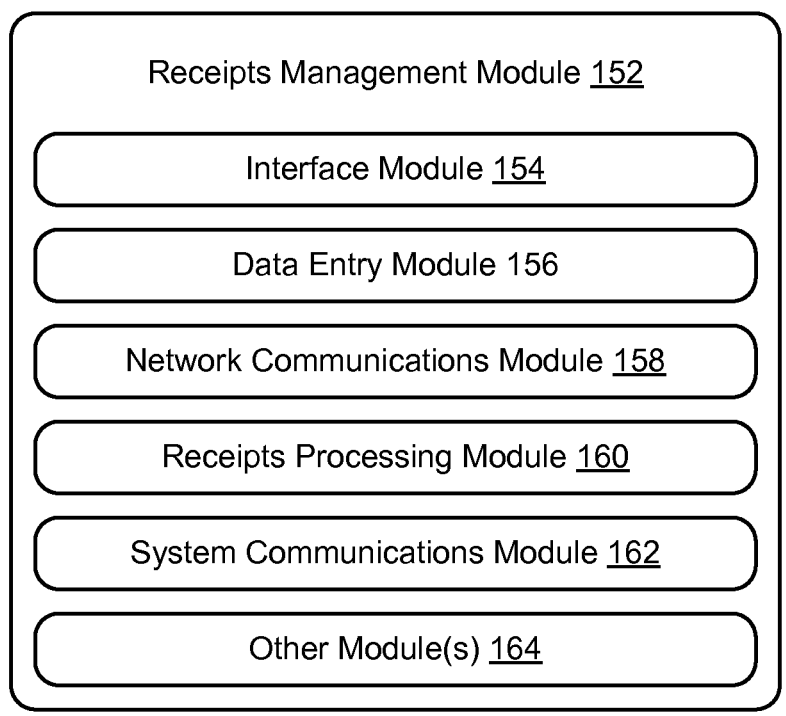
FIG. 9 is a schematic block diagram of one embodiment of a receipts sharing module.

Referring to FIG. 9, a computer system may include a receipts management module 152. The various functions or modules of a receipts management module 152 may be enacted or implemented by any suitable system or component thereof. For example, in selected embodiments, one or more functions or modules of a receipts management module 152 may be distributed across one or more hardware devices, including a mobile electronic device 68A, 68B, a primary computer 12 of a POS system 10, a local server 26, a supervisory server 34, some other onsite resource, some other offsite resource, or the like or combinations or subcombinations thereof. Thus, different embodiments may be adapted to a wide variety of situations, including more rigid legacy systems.

In selected embodiments, a receipts management module 152 facilitates the receipts printing process described herein. The receipts management module may include any suitable arrangement of sub-components or modules. The receipts management module 152 may include an interface module 154 which interfaces with a customer. The interface module may include a display on a mobile electronic device 68A, 68B. The receipts management module 152 may also include a data entry module 156 which may include a keypad or touchscreen on a mobile electronic device 68A, 68B and which allows the customer to enter data associated with splitting a receipt. The receipts management module 152 may include a network communications module 158 which may facilitate communications between the mobile electronic device 68A, 68B, the POS terminal 10, and the server 26, 34, as well as between the customer and other persons.

The receipts management module 152 may include a receipts processing module 160 which may include a receipts management server 34 and which may facilitate processing receipts and preparing receipts for splitting. The receipts management module 152 may include a system communications module 162 which may communicate between a server 26, 34, POS terminal 10 and one or more persons associated with splitting a receipt, such as by way of a mobile electronic device 68B or a computer associated with that person. The system communications module may include a communications device and may transmit notification and receipt information from the server to the person. The receipts management module 152 may also include other modules 164 as are desirable to implement various embodiments. The various modules and parts of the mobile self-checkout module 152 may include hardware, firmware and software components as are desirable for various embodiments and to achieve the various steps, features, and functionality discussed herein.

The flowchart and block diagrams of the Figures illustrate the architecture, functionality, and operation of possible implementations of systems, methods, and computer program products according to one or more embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method being implemented via execution of computing instructions configured to run at one or more processors and stored at one or more non-transitory computer-readable media, the method for splitting an electronic receipt among multiple persons after a purchase transaction and comprising:

completing the purchase transaction involving the multiple persons, wherein an electronic receipt software app comprises a contact list interface configured to provide access to a list of contacts of at least one contact person associated with a first person, wherein the list of contacts contain personal information of each contact person of the at least one contact person, including telephone and email address information of the each contact person, and wherein the personal information from the list of contacts is available to be used, without launching the contact list interface, to transmit information associated with the first person via at least a text message or an email to the at least one contact person;

receiving, with the electronic receipt software app on a mobile electronic device of the first person, the electronic receipt for a bill corresponding to the purchase transaction involving multiple persons, wherein the first person of the multiple persons previously paid the bill corresponding to the electronic receipt;

receiving, by the electronic receipt software app on the mobile electronic device of the first person, a selection of an item from one or more items on the electronic receipt;

causing the electronic receipt software app on the mobile electronic device to display a first menu on a first user interface on the mobile electronic device configured to access the list of contacts of the first person, wherein the multiple persons associated with costs of the bill comprise at least one suggested person, wherein the at least one suggested person is determined from the at least one contact person on the list of contacts of the first person, wherein the contact list interface remains in an un-launched state while the first user interface displays the first menu, and wherein the at least one suggested person previously split a cost of a previous bill with the first person in a previous transaction;

receiving, via the first user interface on the mobile electronic device, a selection of a person of the at least one suggested person to associate with the bill;

upon receiving the selection of the person of the at least one suggested person to associate with the bill, displaying, by the electronic receipt software app on the mobile electronic device of the first person, a second menu configured to allow the first person to allocate an allocation percentage of a cost of the item of the one or more items of the electronic receipt to the person of the at least one suggested person selected to share in the cost of the item of the one or more items, wherein the second menu comprises a slider scale configured to allocate the allocation percentage of the cost of the item of the one or more items when the slider scale is moved between 0 and 100 percent;

receiving a selection of the allocation percentage from the second menu of the electronic receipt software app on the mobile electronic device after a movement of the slider scale;

upon receiving the selection of the allocation percentage, allocating the allocation percentage of the cost of the item to the person of the at least one suggested person to share in the cost of the item;

auto-completing an un-allocated amount of the cost of the item by assigning the un-allocated amount of the cost of the item to at least one other person of the multiple persons, wherein the un-allocated amount plus an amount of the allocation percentage of the cost of the item equals 100% of the cost of the item;

iterating, with the electronic receipt software app on the mobile electronic device, at least one additional allocation percentage, as received by the electronic receipt software app, of a cost for each additional item of the one or more items on the electronic receipt for the person of the at least one suggested person;

assigning, with the electronic receipt software app on the mobile electronic device, at least one additional un-allocated amount of the cost of the each additional item of the one or more items in the electronic receipt to the person of the at least one suggested person; and sending, by the electronic receipt software app on the mobile electronic device of the first person to the person and the at least one other person of the at least one suggested person, the information via the at least the text message or the email comprising an electronic notification, wherein the contact list interface remains in the un-launched state while the electronic notification via the at least the text message or the email is sent, the electronic notification comprising:

a portion of a total cost of the electronic receipt as allocated to the person and the at least one other person of the at least one suggested person; and a pre-determined method of payment requested by the first person to the person and the at least one other person of the at least one suggested person.

2. The method of claim 1, wherein the pre-determined method of payment requested by the first person comprises a peer-to-peer transfer payment system.

3. The method of claim 1, wherein the electronic notification comprises a link to view the electronic receipt and the allocation percentage for the cost of the item of the one or more items.

4. The method of claim 1, wherein the electronic notification comprises a link to effect payment for the portion of the total cost as allocated to each of the person and the at least one other person of the at least one suggested person.

5. The method of claim 1, wherein:
receiving, by the electronic receipt software app on the mobile electronic device of the first person, the selection of the item from the one or more items further comprises initially assigning the cost of the item of the one or more items to the first person.

6. The method of claim 1, wherein receiving the selection of the allocation percentage from the second menu of the electronic receipt software app comprises receiving a selection of a zero allocation percentage.

7. The method of claim 1, wherein receiving the selection of the allocation percentage from the second menu of the electronic receipt software app comprises receiving a designation to split the cost of the item of the one or more items equally among persons associated with the item.

8. The method of claim 1, wherein receiving the selection of the allocation percentage from the second menu of the electronic receipt software app comprises receiving a designation to allocate non-equal percentages of the cost of the item among persons associated with the item.

9. The method of claim 1, wherein receiving the selection of the allocation percentage from the second menu of the electronic receipt software app comprises receiving the movement of the slider scale between the 0 and 100 percent to allocate at least one percentage of the cost of the item among persons associated with the item.

10. A method being implemented via execution of computing instructions configured to run at one or more processors and stored at one or more non-transitory computer-readable media, the method for splitting an electronic receipt among multiple persons comprising:
prior to completing a purchase transaction, wherein an electronic receipt software app comprises a contact list interface configured to provide access to a list of contacts of at least one contact person associated with a first person, wherein the list of contacts contain personal information of each contact person of the at least one contact person, including telephone and email address information of the each contact person, and wherein the personal information from the list of contacts is available to be used, without launching the contact list interface, to transmit information associated with the first person via at least a text message or an email to the at least one contact person;
receiving, with the electronic receipt software app on a mobile electronic device of the first person, the electronic receipt for a bill, unpaid, corresponding to the purchase transaction involving multiple persons, wherein the first person of the multiple persons receives the bill, unpaid, corresponding to the electronic receipt;
receiving, by the electronic receipt software app on the mobile electronic device of the first person, a selection of an item from one or more items on the electronic receipt;
causing the electronic receipt software app on the mobile electronic device to display a first menu on a first user interface on the mobile electronic device configured to access the list of contacts of the first person, wherein the multiple persons associated with costs of the bill comprise at least one suggested person, wherein the at least one suggested person is determined from the at least one contact person on the list of contacts of the first person, wherein the contact list interface remains in an un-launched state while the first user interface displays the first menu, and wherein the at least one suggested person previously split a cost of a previous bill with the first person in a previous transaction;
receiving, via the first user interface on the mobile electronic device, a selection of a person of the at least one suggested person to associate with the bill;
upon receiving the selection of the person of the at least one suggested person to associate with the bill, displaying, by the electronic receipt software app on the mobile electronic device of the first person, a second menu configured to allow the first person to allocate an allocation percentage of a cost of the item of the one or more items of the electronic receipt to the person of the at least one suggested person selected to share in the cost of the item of the one or more items, wherein the second menu comprises a slider scale configured to allocate the allocation percentage of the cost of the item of the one or more items when the slider scale is moved between 0 and 100 percent;
receiving a selection of the allocation percentage from the second menu of the electronic receipt software app on the mobile electronic device after a movement of the slider scale;
upon receiving the selection of the allocation percentage, allocating the allocation percentage of the cost of the item to the person of the at least one suggested person to share in the cost of the item;
auto-completing an un-allocated amount of the cost of the item by assigning the un-allocated amount of the cost of the item to at least one other person of the multiple persons, wherein the un-allocated amount plus an amount of the allocation percentage of the cost of the item equals 100% of the cost of the item;
iterating, with the electronic receipt software app on the mobile electronic device, at least one additional allocation percentage, as received by the electronic receipt software app, of a cost for each additional item of the one or more items on the electronic receipt for the person of the at least one suggested person;
assigning, with the electronic receipt software app on the mobile electronic device at least one additional un-allocated amount of the cost of the each additional item of the one or more items in the electronic receipt to the person of the at least one suggested person; and
sending, by the electronic receipt software app on the mobile electronic device of the first person to the person and the at least one other person of the at least one suggested person, the information via at least the text message or the email comprising an electronic notification, wherein the contact list interface remains in the un-launched state while the electronic notification via the at least the text message or the email is sent, the electronic notification comprising:

a portion of a total cost of the electronic receipt as allocated to the person and the at least one other person of the at least one suggested person; and a pre-determined method of payment requested by the first person to the person and the at least one other person of the at least one suggested person.

11. The method of claim 10, wherein the pre-determined method of payment requested by the first person comprises a peer-to-peer transfer payment system.

12. The method of claim 10, wherein the electronic notification comprises a link to view the electronic receipt and the allocation percentage for the cost of the item of the one or more items.

13. The method of claim 10, wherein:
receiving, by the electronic receipt software app on the mobile electronic device of the first person, the selection of the item from the one or more items further comprises initially assigning the cost of the item of the one or more items to the first person.

14. The method of claim 10, wherein:
receiving, the allocation percentage of the cost of the item of the one or more items comprises receiving a designation to allocate a non-equal percentage of the cost of the item among persons associated with the item.

15. The method of claim 14, wherein receiving, the selection of the allocation percentage from the second menu of the electronic receipt software app comprises receiving a designation to split the cost of the item equally among the multiple persons.

16. The method of claim 14, wherein receiving, the selection of the allocation percentage from the second menu of the electronic receipt software app comprises receiving individual allocations for each of the multiple persons to split the cost of the item non-equally.

17. The method of claim 1, further comprising:
sending the electronic notification to each of the multiple persons indicating their portion of the total cost of the electronic receipt,
wherein:
the pre-determined method of payment requested by the first person comprises a peer-to-peer transfer payment system;
the electronic notification includes a link to view the electronic receipt and the allocation percentage of the cost of the item of the one or more items;
the electronic notification includes a link to effect payment for the portion of the total cost;
receiving, by the electronic receipt software app on the mobile electronic device of the first person, the selection of the item from the one or more items further comprises assigning the cost of the item of the one or more items to the first person;

receiving, the selection of the allocation percentage from the second menu of the electronic receipt software app comprises receiving a selection of a zero allocation percentage;
one or more other persons are persons who have been previously selected by the first person to split particular item costs for the one or more items on the electronic receipt; and
receiving, from the electronic receipt software app on the mobile electronic device, the allocation percentage of the cost of the item comprises receiving a designation to split the cost of the item of the one or more items equally among persons associated with the item.

18. The method for splitting an electronic receipt among multiple persons of claim 10, further comprising:
sending the electronic notification to each of the multiple persons indicating their portion of the total cost of the electronic receipt;
wherein:
the pre-determined method of payment requested by the first person comprises a peer-to-peer transfer payment system;
the electronic notification is sent via text message or an email to the mobile electronic device associated with the person;
the electronic notification includes a link to effect payment for the portion of the total cost;
receiving the selection of the item from the one or more items further comprises assigning the cost of the item of the one or more items to the first person;
receiving the selection of the allocation percentage from the second menu of the electronic receipt software app comprises receiving a selection of a zero allocation percentage;
one or more other persons are persons who have been previously selected by the first person to split particular item costs for one or more items on the electronic receipt; and
receiving the selection of the allocation percentage from the second menu of the electronic receipt software app comprises receiving a designation to split the cost of the item of the one or more items equally among persons associated with the item.

19. The method of claim 1, wherein auto-completing the un-allocated amount of the cost of the item further comprises automatically moving the slider scale to a remaining percentage equal to 100 minus the allocation percentage.

20. The method of claim 10, wherein auto-completing the un-allocated amount of the cost of the item further comprises automatically moving the slider scale to a remaining percentage equal to 100 minus the allocation percentage.

* * * * *